June 1, 1943.　　　C. E. KENT ET AL　　　2,320,700
BACK-UP RING OR SLEEVE FOR WELDING
Filed Nov. 28, 1940
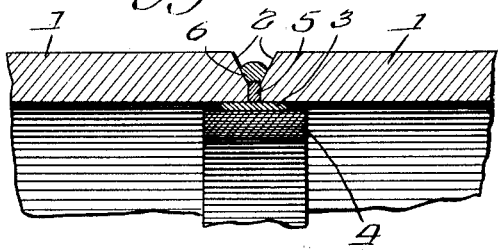
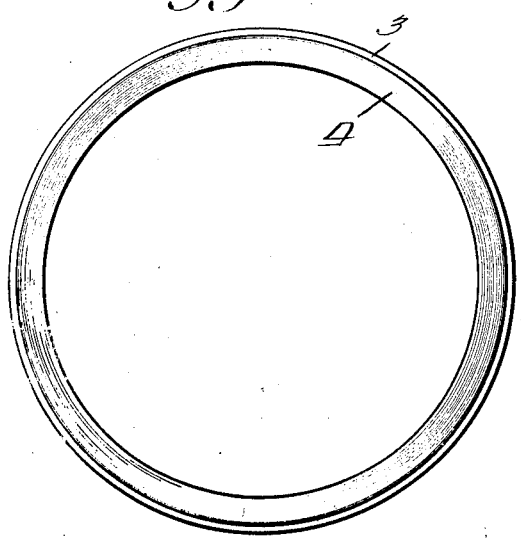
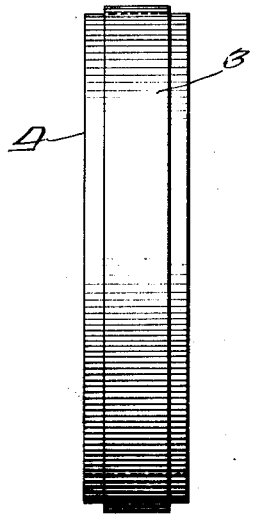
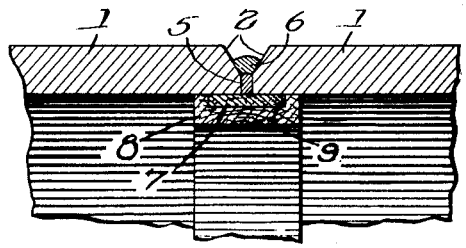
Inventors:
Charles E. Kent &
Otto M. Carlson
By: Joseph O. Lange
Atty.

Patented June 1, 1943

2,320,700

UNITED STATES PATENT OFFICE 2,320,700

BACKUP RING OR SLEEVE FOR WELDING

Charles E. Kent and Otto M. Carlson, Chicago, Ill., assignors to Crane Co., Chicago, Ill., a corporation of Illinois Application November 28, 1940, Serial No. 367,552

2 Claims. (Cl. 113—112)

More particularly, our invention relates to a disposable type of ring useful in the art of joining pipes and the like by welding. In assembling such relatively thin tubular sheets, as for example the walls of pipe, by means of the welding referred to, the edges are preliminarily prepared with the conventional bevel or chamfer so as to provide an open V or U into which the necessary metal for making the joint is applied during the welding operation. However, one of the more serious objections to be overcome in this class of work arises from the tendency for the welding material to drop through the opening at the bottom of the V or U into the inner periphery of the pipe or tubing frequently forming what is commonly termed icicles. The latter are primarily metallic obstructions in the line of flow which create serious hazards, because during the course of service they are generally dislodged by corrosion or vibration and are carried by the line flow into machines, turbines, or other manufacturing or processing equipment, or subsequently become lodged upon a valve seat so as to prevent the tight closing of the latter.

Various methods have been attempted, from time to time, to prevent the formation of welding icicles within pipe lines, pressure vessels and the like, as for example of the respective types disclosed in the Kershaw patent, No. 1,990,077, issued February 5, 1935, and the Kane patents, No. 1,962,350 and No. 1,962,352, issued June 12, 1934. In the Kershaw method, a completely nonfusible plug or sleeve contacts with the inner periphery of the tubing to prevent the flow of melted material into the interior of the pipe during welding. However, the Kershaw method has had the objection that the non-fusible material used for the plug or ring does not permit its easy removal from the line upon completion of the weld; accordingly the Kershaw method has not been used extensively in light of this difficulty.

The method outlined in the Kane patents employs combustible rings which give off carbon monoxide gas during welding, the object being to prevent oxidation of the inner surface of welding metal. Kane's rings are made of pressed wood, paper, or the like to provide the necessary combustibility and carbon monoxide gas. It has been found however that such back-up rings do not permit of producing a substantially sound weld due to the formation of blow holes by the gas escaping from the burning ring.

We have been long familiar with the Kershaw and Kane methods and their respective drawbacks. Thus we have been faced with the necessity for providing a satisfactory material capable of resisting the initial welding temperatures at least until a substantial portion of the first bead of weld metal has been laid in and then, upon reaching its kindling temperature, break into flames and burn to a highly decomposed and therefore readily removable condition. This requirement has pointed to the need for a fusible or a thermally decomposable material of sufficiently poor heat transfer properties that the decomposition of the material itself is delayed until the bottom of the V or U channel between the members to be welded has been sealed with weld metal.

We believe that the optimum type of back-up ring is one that retains its strength and shape as long as it is needed and then reduces itself to an easily disposable condition under the influence of the subsequent temperatures encountered.

More particularly, we have found that the most satisfactory type of back-up ring or sleeve is made with at least two characteristics, that is with high insulating and slow burning properties at the surface location contacting the molten weld metal and preferably with the inside peripheral portion of the ring made of a material which is sufficiently strong to prevent collapsing. Preferably it is tardily combustible by reason of the insulating outer ring so that after the first bead of weld metal has been laid in the bottom of the V or U groove, the ring will then commence to burn and by reason of such combustion be reduced completely to a soft, powdery mass of relatively easily removable ashes within the period required for the joint to be completely welded. The advantage of the latter type of ring over one having a relatively highly combustible portion in contact with the weld metal is obvious. The possibility of blow holes in the welded metal due to gasification of the back-up ring while metal is still molten is overcome or at least greatly minimized. Oxidation of the weld metal inside the pipe is eliminated by reason of the snug fit between the back-up ring and the inside of the pipes.

More specifically, we have discovered that by the use of thermoplastic or thermosetting organic plastics material, such as "Vinylite," "Bakelite," cellulose acetate, "Durez," etc., or a strip of loosely bonded inorganic material, such as powdered asbestos encased or contained within a material which is relatively highly combustible, as for example a wood or cardboard ring, the molten drip or icicles forming in welded joints will be prevented. At the same time full and complete fusion will be allowed through the thickness of the weld.

Previously, we have also known that metal rings have been used to prevent the formation of icicles but these have been objectionable in that they have not been removable and have therefore reduced flow area and contributed to obstructions in which fluid turbulence would result. In addition, by our novel method employed, the formation of pockets or crevices in which line erosion might ordinarily start has been eliminated. In its superiority over the refractory type of ring or sleeve of the earlier art referred to our device accomplishes a smooth weld and, as explained, by the subsequent combustion of the ring provides for the back-up strip being reduced to clean, fine ashes which can be readily blown out or discharged from the pipe or line upon completion of the welded section.

Briefly, it has been found that either paper, wood or the like may act as a support for the plastic or asbestos or other suitable insulating material and serve as a fuel to insure its complete disintegration. Where the plastics insulating material is used, the burning of the wood causes the plastics to melt or burn, too; where the powdered asbestos, or the like is used, it merely disintegrates from lack of support after the wood has burned. Thus, broadly, a principal purpose of our invention lies in the provision of a back-up right for welding which is simple in design, extremely light in weight and economical to produce.

Another purpose of our invention is the provision of a back-up ring made of a fusible or thermally decomposable material or material combination having a relatively low coefficient of heat transfer.

The detailed advantages arising from our invention will be more clearly shown in connection with the specification and drawing, in which Fig. 1 shows a fragmentary section of assembled pipes with the back-up ring.

Fig. 2 is an exterior side view of a ring prepared in accordance with our invention.

Fig. 3 is an exterior front view of the ring described in Fig. 2.

Fig. 4 is a fragmentary sectional assembly of a modified ring.

Referring now to Fig. 1, the pipes 1 shown in fragmentary section are provided with the scarfed or beveled ends 2 and assembled in predetermined relation for the welding operation. The inner end peripheries of the pipes 1 then are fitted, as indicated, with a small strip of thermosetting plastics material, such as phenol formaldehyde resin or a thermoplastic plastics material, as for instance "Vinylite," a co-polymer of vinyl acetate and vinyl chloride, or a heat resistant inorganic material generally designated as 3. It is placed around a ring 4 of wood, cardboard, plastics or like combustible material and inserted in the pipe so as to serve as a means for supporting the plastics or mineral composition 3 and at the same time providing fuel to burn or disintegrate the annular strip 3 completely after its purpose of initially supporting the latter has been accomplished.

During the actual welding operations it has been found that the strip 3 holds together until the first bead of welding metal, designated as 5, flows and hardens. After the first bead 5 has been laid in, the back-up strip 4 commences to burn due to the continued and accumulated application of heat. After the second bead, referred to as 6, has been completed, it is found that the supporting strip 4 has been consumed or disintegrated by the resultant fire so that there is no trace of the strip 3 in its original form. We have found that nothing remains of the supporting strip 4 and the insulating strip 3 except soft, powder-fine ashes.

Inspection of the resultant weld obtained by this method indicates full and complete fusion through the entire wall thickness. In addition, the weld metal is smooth and free from drip or icicles to form a relatively unbroken connection between the inner peripheral walls of the pipe or tubing.

Figs. 1, 2 and 3 show a preferred form of supporting ring usable where the insulating strip 3 is a cohesive material, such as the plastics materials already described.

Fig. 4 shows a grooved modification designed especially for the loosely bonded, poorly coherent, inorganic materials, such as powdered asbestos, fireclay or the like.

As already explained generally, the function of the plastics insulating strip 3 in Fig. 1 is identical to that of the asbestos strip 7 in Fig. 4 in that the strips 3 and 7 retain their form and serve as an insulator sufficiently long enough to prevent the dripping of the weld metal from the original bead 5 into the interior of the tubing, whereby the formation of the icicles referred to is prevented. As continued heat however is applied, the rings 4 and 8 eventually catch fire and since they are no longer able to serve as supporting means for the rings 3 and 7, the latter collapse to form a fine powder-like deposit readily removable upon the application of compressed air or upon simply standing the assembled pipe on end so as to allow the remaining deposit to be discharged therefrom by gravity.

In short, we have invented an improved welding back-up ring which will decompose at approximately welding temperatures after the possibility for icicle formation is passed. Where the device is constructed of a combination of materials, at least one of these must be either combustible or else fusible in order to promote the necessary disintegration as described. It should be noted that the term "fusible" is used here in the sense that the material softens or liquefies upon the application of heat. In general, the ring must possess at the outside periphery, which contacts the weld metal, a portion having a high insulating quality and not possessing a high combustion rate whereby the ring is caused to approach its kindling or decomposition temperature slowly.

While the described modification of our invention consists of two rings, the inner ring being of wood or cardboard and the outer ring being of a plastics material, such as "Vinylite" or any other suitable thermoplastic or thermosetting plastics material, or loosely bonded powdered asbestos, it should be apparent to one skilled in the art, in view of our disclosures herein, that many embodiments may be made within the spirit of our invention by varying the construction or by using other materials having the same properties as those named.

We have discovered that practically any of the common plastics materials is suitable, either as an insulating layer for the outside periphery of the ring or as an ingredient, with or without the inclusion of some relatively combustible material such as wood, for the inside ring. In some cases an all-plastics ring could be used, with or without the inclusion of a more readily combustible material such as wood, paber, coal or rags.

Plastics are peculiarly adaptable to this service because they have:

(a) Very low heat conductivities, comparing favorably with the best commercial insulating materials;

(b) Slow burning qualities, many of them requiring an outside fuel to sustain their combustion;

(c) Excellent molding qualities, resulting in ease of fabrication; and
(d) Light weight, making them easy to handle in quantity.

The tabulation below, for a representative group of plastics, shows how universally the above properties are possessed by the plastics materials. The inclusion, in this table, of comparative heat conductivity data for metals and heat insulators, shows the general excellence of the plastics materials from this standpoint:

*Plastics properties from "Modern Plastics" October, 1940*

| | Heat conductivity (cal.) (cm.) (sec.) (cm.²) (°C.) | Burning rate | Specific gravity |
|---|---|---|---|
| Thermosetting plastics: | | | |
| Phenol formaldehyde resin (wood flour filler). | .0004-.0012 | Very low | 1.25-1.52. |
| Phenol furfural (wood flour filler). | .0003-.0005 | do | 1.3-1.4. |
| Urea formaldehyde (alpha cellulose filler). | .0007 | do | 1.45-1.50. |
| Thermoplastic plastics: | | | |
| Vinyl chloride-acetate ("Vinylite"). | .0004 | Nil | 1.34-1.36. |
| Vinyl chloride resin. | .0004 | do | 1.2-1.6. |
| Methyl methacrylate | .0001-.0010 | Slow | 1.185. |
| Polystyrene | .0002 | do | 1.05. |
| Chlorinated rubber. | .0003 | Nil | 1.64. |
| Isomerized rubber | .0003 | Slow | 1.06. |
| Hard rubber | .0003 | Medium | 1.12-1.80. |
| Cellulose acetate. | .0005-.0009 | Slow | 1.27-1.37. |

*Comparative heat conductivity data from "Handbook of Chemistry and Physics" 23rd ed., 1939, published by Chemical Rubber Publishing Co.*

| | Heat conductivity (cal.) (cm.) (sec.) (cm.²) (°C.) |
|---|---|
| Comparative data for metals and heat insulators: | |
| Pure copper | .9180 |
| Aluminum | .5040 |
| Brass | .2600 |
| Steel | .1080 |
| Cork | .0007 |
| Fire brick | .0003 |
| Infusorial earth (pressed bricks) | .0003 |

While we have disclosed the use of powdered asbestos in connection with the construction shown in Fig. 4, it is not our intention to limit ourselves to the use of this material as we have discovered that the combination of a combustible supporting ring with any loosely bonded inorganic insulating material, such as for example loosely bonded burnt lime, infusorial earth, fireclay, sheet asbestos, rock wool, and the like, can be used advantageously.

Another modification within the spirit of our invention is the incorporation of a fire-inhibiting medium into the material of the back-up ring which acts automatically to snuff out fire in the ring as soon as it occurs. This of course is effective only as long as some unused inhibiting material remains, after which the ring will spontaneously burst into flames and be consumed by the fire; thus, by varying the percentage of fire inhibitant there is a measure of control over the time interval between the beginning of the welding operation and the ignition of the back-up ring.

One other suggested modification has its inner ring 9 constructed of a permanent non-combustible material, such as steel or copper with a thermally disintegrable outer layer 7, such as "Vinylite" or loosely bonded asbestos, in contact with the weld metal. Such a ring, if connected by suitable withdrawal means as a chain or cable, for example, extending to the end of one of the joined pipes, would be readily removable when the outer layer had burned off and would therefore be usable over and over again simply by replacing the outer insulating covering 7.

It is quite apparent from numerous installations that it takes considerable heating to raise the kindling temperature of the supporting ring to such extent that its combustion occurs before the first bead of welding has been completed and, in the case of electric welding, despite increasing the current on the first bead to create abnormally high welding temperatures, drip or formed icicles would not occur.

Throughout the specification, reference has been made to the use of a plastic such as "Vinylite" or an inorganic insulating ring such as asbestos, and to cardboard or wood as a supporting ring. Obviously, these materials are used merely in an illustrative sense and accordingly the invention may be expanded by employing a wide variety of similar materials where one of which, either singly or in combination, might be considered to fall within the terms of the invention as defined by the claims appended hereto.

We claim:

1. A welding back-up ring for use in tubular members and the like comprising a pair of fitted concentric rings mounted one upon the other, the outside ring being an organic plastics material of the type including properties wherein the material is tardily disintegrable thermally with a low heat conductivity, the inside ring being disintegrable by combustion.

2. In the process of joining substantially tubular members or the like together by welding which comprises assembling the said tubular members in end to end relation with a space therebetween for the subsequent welded joint, applying a thermally disintegrable ring having an outside diameter substantially equal to the inside diameter of the tubular articles, said disintegrable ring comprising a pair of concentric circular members, the outer of said circular members being of an organic plastics material of the type having high heat insulating and slow burning properties and the inner of said circular members being of an easily combustible material, inserting such disintegrable ring in position so that the outer circular member is in substantial contact with the inside walls of each of the said tubular members, the inserted ring combination being tardily combustible at preliminary welding temperatures, whereby upon the subsequent combustion of the inner circular member the entire ring combination is disintegrated to the extent of being readily removable from the joined tubular members.

CHARLES E. KENT.
OTTO M. CARLSON.

CERTIFICATE OF CORRECTION.

Patent No. 2,320,700. June 1, 1943.

CHARLES E. KENT, ET AL.

It is hereby certified that error appears in the printed specification of the above numbered patent requiring correction as follows: Page 2, first column, line 21, for "right" read --ring--; second column, line 67, for "paber" read --paper--; and that the said Letters Patent should be read with this correction therein that the same may conform to the record of the case in the Patent Office.

Signed and sealed this 29th day of June, A. D. 1943.

(Seal)

Henry Van Arsdale,
Acting Commissioner of Patents.